US007860110B2

(12) United States Patent
Lee

(10) Patent No.: US 7,860,110 B2
(45) Date of Patent: Dec. 28, 2010

(54) AUTO-ADDRESSING SYSTEM AND METHOD

(75) Inventor: Kenneth Sunghwan Lee, Cambridge, MA (US)

(73) Assignee: Schneider Automation Inc., North Andover, MA (US)

( * ) Notice: Subject to any disclaimer, the term of this patent is extended or adjusted under 35 U.S.C. 154(b) by 924 days.

(21) Appl. No.: 11/139,031

(22) Filed: May 26, 2005

(65) Prior Publication Data
US 2006/0268854 A1  Nov. 30, 2006

(51) Int. Cl.
*H04L 12/56* (2006.01)
(52) U.S. Cl. .................. 370/395.54; 370/474; 370/475; 709/245; 710/3; 710/4
(58) Field of Classification Search ................ 370/389, 370/392, 395.1, 395.54, 397, 398, 399, 217–218, 370/221, 474, 475; 709/245; 710/3, 4
See application file for complete search history.

(56) References Cited

U.S. PATENT DOCUMENTS

| | | | | |
|---|---|---|---|---|
| 6,643,561 | B1* | 11/2003 | Torvinen | 700/166 |
| 6,744,450 | B1* | 6/2004 | Zimniewicz et al. | 715/841 |
| 6,982,953 | B1* | 1/2006 | Swales | 370/218 |
| 2002/0184410 | A1* | 12/2002 | Apel et al. | 710/5 |
| 2003/0185237 | A1* | 10/2003 | Baker, Jr. | 370/469 |
| 2004/0230703 | A1* | 11/2004 | Sukigara | 709/253 |

OTHER PUBLICATIONS

W. Richard Stevens, TCP/IP Illustrated, Dec. 31, 1993, vol. 1, Chapter 23 TCP Keepalive Timer.*
Troll, Automatically Choosing an IP Address in an Ad-Hoc IPv4 Network, Mar. 2, 2000, IETF.*
Lakshmanan, Reverse Address Resolution Protocol (RARP)—Q&A, Oct. 20, 1999, Lakshmanan.*
Telemecanique, Advantys STB System Planning and Installation Guide, Sep. 2003, Telemecanique.*
Telemecanique, Advantys STB Modbus Plus Network Interface Applications Guide, Sep. 2003, Telemecanique.*

* cited by examiner

*Primary Examiner*—Aung S Moe
*Assistant Examiner*—Hoon J Chung

(57) ABSTRACT

A modular distributed I/O system that allows one or more modules of an island to be omitted without requiring reconfiguration of the system and a method for auto-addressing the system. The island includes a network interface module that is operably connected to a user interface. The user interface allows a user to indicate for each of the nodes of the island whether the node has an I/O module physically present or not physically present. This allows a constant process image in a system where the process image is dependent upon node ID's of modules, and modules are assigned addresses (i.e., ID's) automatically without using unique markers or signatures.

25 Claims, 4 Drawing Sheets

AUTO-ADDRESSING SYSTEM AND METHOD

CROSS-REFERENCE TO RELATED APPLICATIONS

None.

FEDERALLY SPONSORED RESEARCH OR DEVELOPMENT

None.

TECHNICAL FIELD

The present invention generally relates to auto-addressing of modular distributed I/O systems in automation networks. More specifically, the present invention relates to a modular distributed I/O system that allows one or more modules to be omitted without requiring reconfiguration or reprogramming of a controller of the system.

BACKGROUND OF THE INVENTION

A programmable logic controller (PLC) is used to monitor input signals from a variety of input points (i.e., input sensors) that report events and conditions occurring within a controlled process. For example, a PLC can monitor such input conditions as motor speed, temperature, pressure, volumetric flow and the like. The PLC has a control program stored within its memory to instruct the PLC on what actions to take upon encountering particular input signals or conditions. In response to these input signals provided by the input sensors, the PLC derives and generates output signals that are transmitted to control the process via PLC output points to various output devices such as actuators and relays. For example, an output signal can be provided by the PLC to speed up or slow down a conveyer, rotate the arm of a robot, open or close a relay, raise or lower temperature, as well as many other possible control functions.

The input and output points referred to above are typically associated with input modules and output modules, respectively. Input and output modules are collectively referred to as I/O modules herein. Those skilled in the art alternatively refer to such I/O modules as I/O cards or I/O boards. I/O modules are typically pluggable into respective slots located on a backplane board or other attachment system provided by the PLC. The slots are coupled together by a main bus that couples any I/O module plugged into the slots to a central processing unit (CPU). The CPU itself can be located on a card that is pluggable into a dedicated slot on the backplane board of the PLC.

In many control systems, PLCs are arranged in a master/slave network that includes a master PLC and a plurality of remote slave units that can include other PLCs or devices. In this type of a network, the master PLC controls its own I/O connection points and also the respective derived from data obtained from the remote slave units, which is obtained from the I/O module(s) connected to each remote slave unit.

To meet the needs of machine manufacturers and users, automation architectures have been decentralized while delivering performance comparable to centralized systems. For instance, the ADVANTYS STB distributed I/O system is an open, modular input/output system that makes it possible to design islands of automation managed by a master controller via a bus or communication network. The ADVANTYS STB distributed I/O system is a product of Schneider Automation, Inc., 1 High St, North Andover, Mass.

These islands, typically installed close to the machine, help reduce the time and cable cost for sensors and actuators, while increasing system availability. The island components are electronic modules mounted on one or more DIN rails (i.e., standardized rails). These clusters of modules, known as segments, carry a bus from the beginning to the end of each island. The island bus provides power distribution, signal sensing, and power management to compatible modules.

An island can include one or more segments comprising a network interface module (NIM), a power distribution module (PDM), and additional modules for various architectures such as I/O modules, bus extension modules, island bus termination, and island bus extensions.

The island is typically configured using a user interface. The NIM is responsible for assigning addresses to the I/O modules—using auto-addressing protocol—and for maintaining a process image of the I/O modules. Both the NIM and the I/O modules participate in I/O modules automatically obtaining their addresses based on their relative physical locations—using auto-addressing protocol. The NIM is responsible for maintaining a process image of the I/O modules, which is based on the addresses of the I/O modules. Such an addressing scheme could not handle the situation where a user wanted to physically remove I/O modules that correspond to unwanted options without changing the program to add/delete the options. The present invention provides a protocol to overcome these and other problems.

SUMMARY OF THE INVENTION

The present invention is directed to a unique auto-addressing protocol for a modular distributed I/O system that allows one or more I/O modules to be omitted without requiring reconfiguration or reprogramming of the system. This allows the system to keep the identical process image of the island even if the user removes certain modules from the base set. Accordingly, by maintaining the process image, a user does not need to reconfigure or change the program for a PLC of the system.

The present invention is also directed to a method of maintaining constant process image in a system or apparatus where the process image is derived from node ID's of slave devices. The method includes automatically assigning node ID's without requiring physical switches or other distinguishing data (e.g., a serial number) for each node.

In one embodiment, an auto-addressing protocol is provided in a network interface module and I/O modules for skipping node ID's of uninstalled modules (i.e., options), while building the process image as if all modules are present within a distributed I/O system.

In another embodiment of the invention, an apparatus comprises a network interface, installed I/O modules operatively connected to the network interface and, an addressing protocol within the network interface providing for skipping node ID's of one or more uninstalled I/O modules. The installed I/O modules are configured to support the addressing protocol. The addressing protocol includes data indicating if an I/O module is configured to be physically present or not present. The apparatus can be connected to a local area network. Moreover, the network interface can be operatively connected to a main PLC (especially via the local area network).

According to another embodiment, a system for configuring a process image with one or more optionally uninstalled modules comprises an island having a network interface module and a plurality of connections or ports for I/O modules. The system includes configuration software connected to the network interface module that provides, for each one of the plurality of connections or ports, one of an indication of whether an I/O module configured in the base system is to be physically present or not present. The configuration software can be implemented to skip allocation of node IDs for I/O modules that are configured to be not physically present while creating a process image as if all I/O modules were present. In this regard, the configuration software can create a bit-mapped field that indicates whether an I/O module is to be physically present or not present in the island. The bit-mapped field can be transferred to the network interface module.

The system is set up so that the operational states of the island that rely on operational states of an individual I/O module only consider I/O modules that are configured to be physically present. The system can also be set up so that scanning of the island for slave I/O modules is done only for those connections of the plurality of connections wherein an I/O module is configured to be physically present.

According to yet another embodiment of the invention, a method of configuring a process image of an island to indicate optionally uninstalled I/O modules comprises the steps of providing an island having a network interface module and a plurality of ports capable of connection to I/O modules, connecting I/O modules to select ports of the plurality of ports and, creating a process image of the island that indicates for each port of the plurality of ports one of whether an I/O module is to be physically present and not present. The creating step can include generating a bit-mapped field that indicates one of whether an I/O module is physically present and not present for each port of the plurality of ports. The user interface can be utilized for entering an indication of one of physically present and not physically present for each port of the plurality of ports in the island. This may be accomplished, for example, by checking a box in a window generated on a screen of the user interface. The method further includes providing a network interface for automatically creating the process image using a fixed set of rules.

Other features and advantages of the present invention will be apparent from the following specification taken in conjunction with the following drawings.

DETAILED DESCRIPTION

Figure 1:
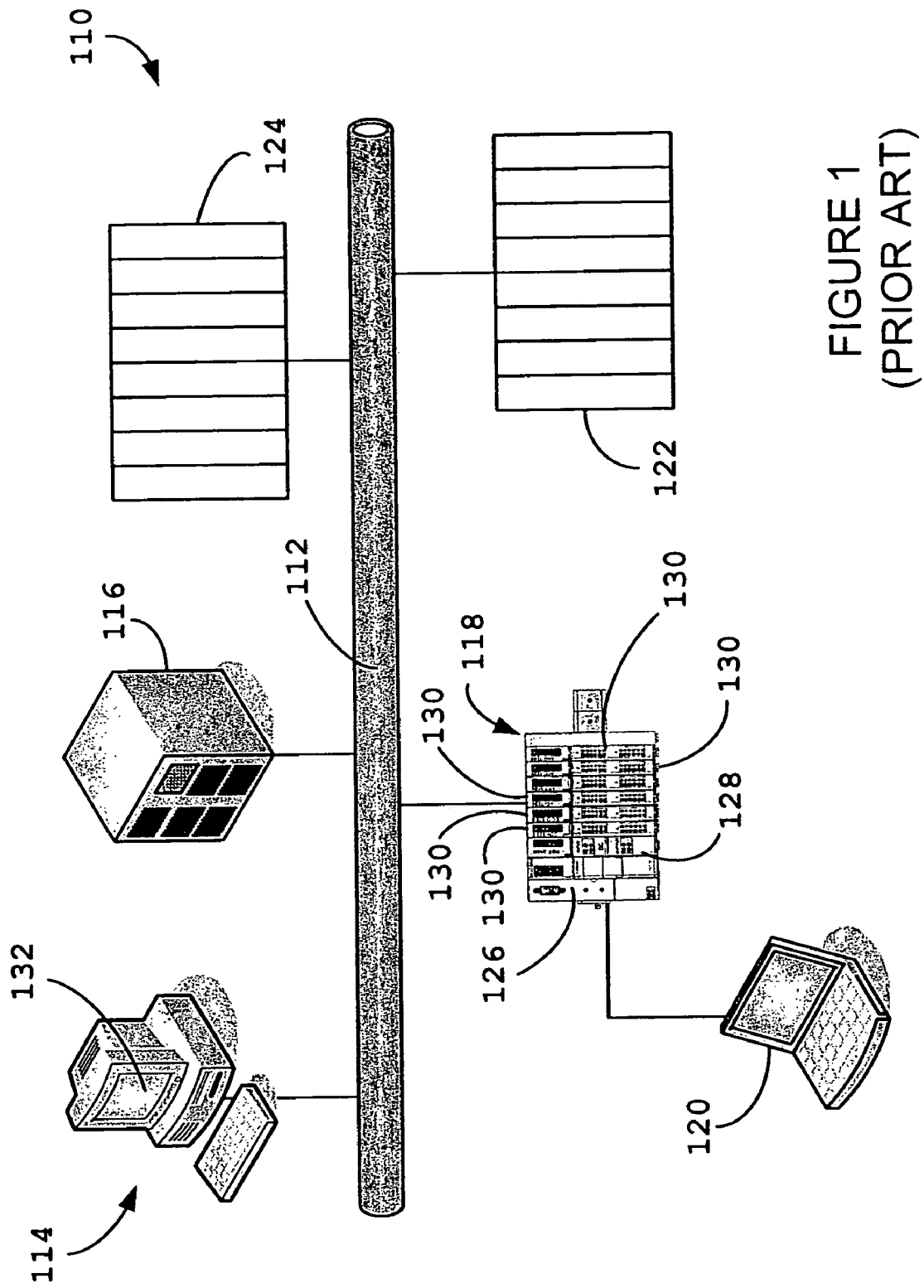
FIG. 1 is a simplified block diagram of a typical automation control system or network having a distributed I/O system or island.

While this invention is susceptible of embodiments in many different forms, there is shown in the drawings and will herein be described in detail a preferred embodiment of the present invention with the understanding that the present disclosure is to be considered as an exemplification of the principles of the invention and is not intended to limit the broad aspect of the present invention to the embodiment illustrated.

FIG. 1 depicts a typical automation control network or system 110 having a distributed I/O system (i.e., island). The automation system 110 includes a host computer 114, a fieldbus master 116, a distributed I/O system or island 118, a human-machine interface (HMI) terminal 120, other network nodes 122, and other slave PLCs 124. The distributed I/O system 118 includes a network interface module (NIM) 126, a power distribution module (PDM) 128, and I/O modules 130.

Figure 2:
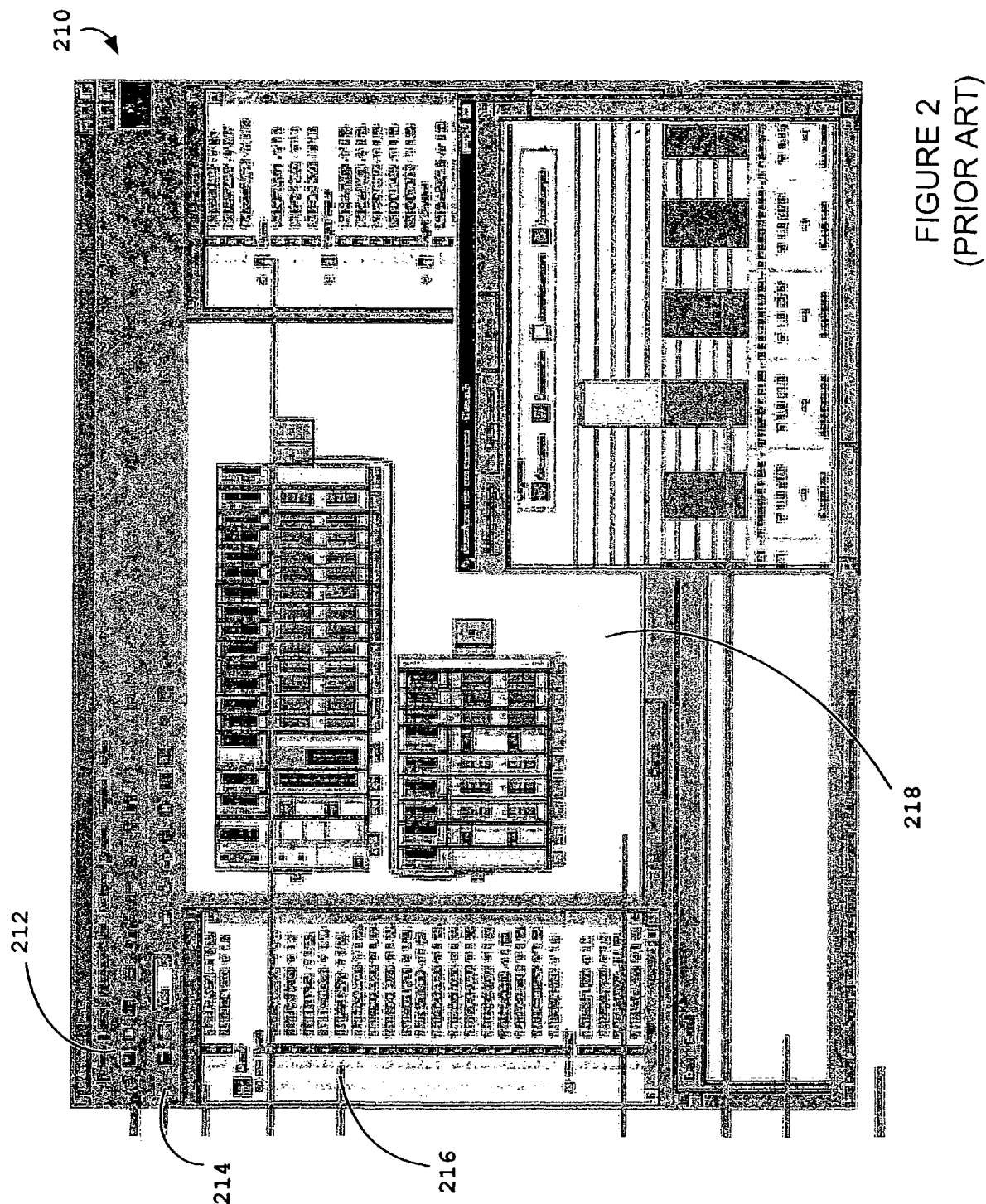
FIG. 2 is a main screen for configuring the distributed I/O system or island shown in FIG. 1.

The island 118 is configured using a user interface (i.e., the host computer 114) having a software interface installed thereon. As shown in FIG. 2, the software provides a main screen 210 on the host computer monitor 132 (FIG. 1). The a main screen 210 includes several windows and toolbars such as a menu bar 212, a toolbar 214, an application browser 216 for browsing the various islands and segments of each island, and a main window 218 for viewing islands and segments.

Figure 3:
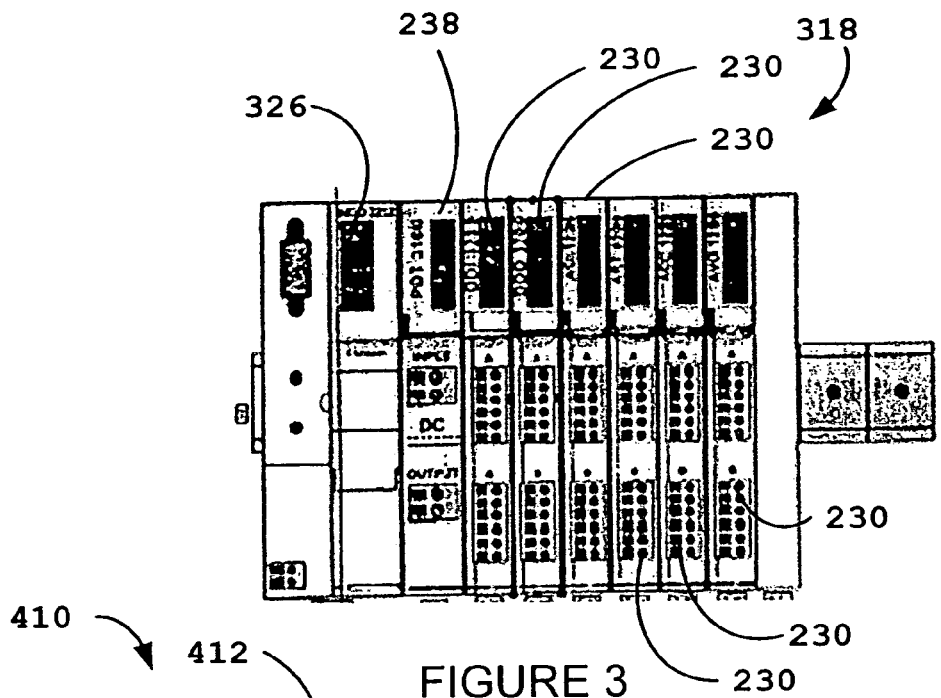
FIG. 3 is an elevation view of a distributed I/O system or island in accordance with the present invention.

Turning to FIG. 3, an elevation view of a distributed I/O system or island in accordance with the present invention is depicted. The distributed I/O system or island 318 can be used within the control network depicted in FIG. 1. As indicated previously, the control network 110 includes, but is not limited to, a local area network 112 having a host computer 114 and at least one master or main programmable logic controller (PLC) 116 connected thereto. Additionally, the distributed I/O system 318 (FIG. 3) is connected to the local area control network 112. The island 318 has a network interface module 326, a power distribution module 328, and a plurality of I/O modules 230.

Turning back to FIG. 1, the local area network (LAN) 112 can be Ethernet based (e.g., IEEE 802.3) or can use other protocols such as, but not limited to, CANopen, Profibus, FIPIO or the like. Furthermore, the network 112 can be wired or wireless (e.g., IEEE 802.11 or the like).

The master or main PLC 116, like the host computer, is operatively connected to the local area network 112. As will be appreciated by those having skill in the art, both the host computer 114 and the main PLC 116 can be conventional products that are currently available in the marketplace.

The host computer 114 is operatively connected to the master or main programmable logic controller 116 via the LAN 112. In operation, the host computer 114 provides the master or main programmable logic controller 116 with data or programming that represents a desired operation or function to be performed by the control network 110. The data can be based, at least in part, on information received by the host 114 from the input/output (I/O) devices or modules within the control network 110.

Further, the host computer 114 supplies the island 318 with configuration data or programming. In particular, a configuration program is loaded onto the host computer 114 where, by executing the program, a user can configure the island 318.

The I/O devices or modules 330 that can be attached to the island 318 include, for example, input sensors and/or output actuators. The input sensors can be for a variety of variables including, but not limited to, temperature, flow, pressure, speed, and the like.

The island 318 maintains the same process image after a module is configured to be not present and physically removed from a base set of modules for the island. Accordingly, by maintaining the process image, a user is able to operate the same configuration and program without being required to change the configuration or program in the PLC 116.

An auto-addressing protocol is provided in a network interface module and an I/O module for skipping node ID's of uninstalled modules (i.e., options), while building the process image as if all modules are present.

The user is provided with a window wherein the user configures a full system that includes all modules that the user may want to use in the process. For example, the user may design a system wherein the island uses six (6) ADVANTYS I/O modules in the process as shown in FIG. 3.

Figure 4:
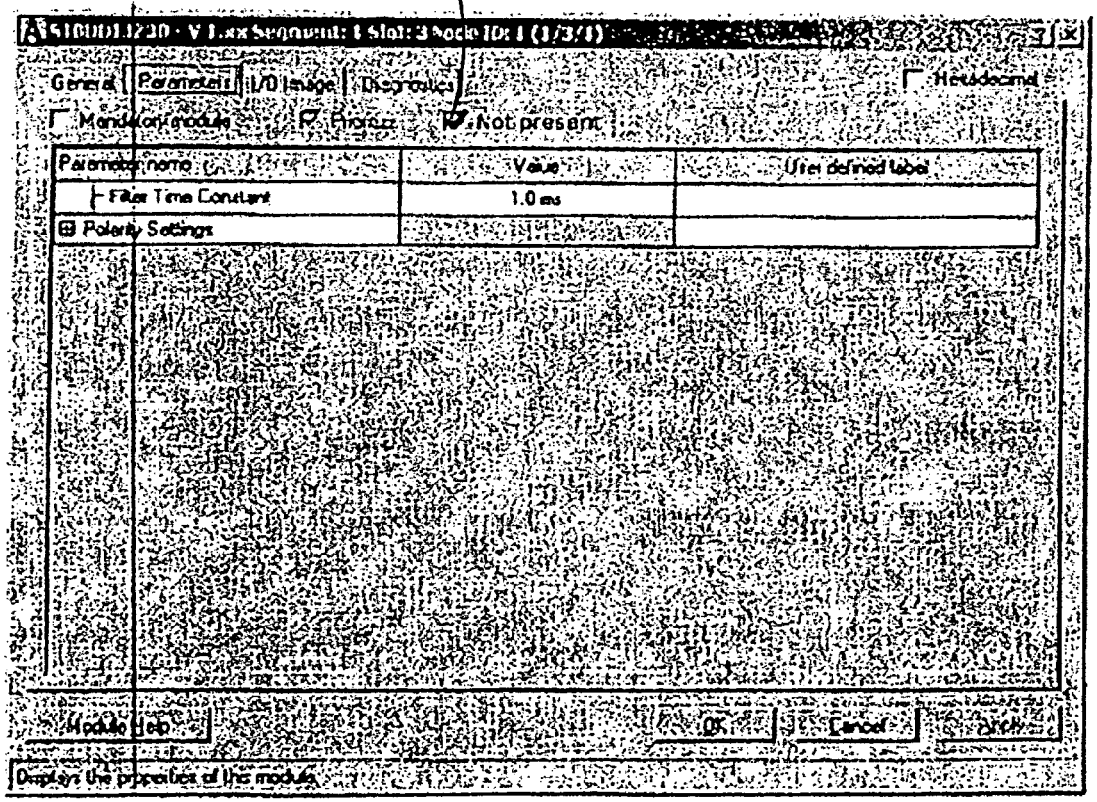
FIG. 4 is a window for configuration of an I/O module within the distributed I/O system or island of FIG. 3.

Next, the user chooses the modules that the user does not wish to physically install, but still take up space in the process image to maintain the same process image as the original full system. In one embodiment, the selection process can be accomplished via a check box 412 in a "Parameters" window 410 of the I/O module in the configuration software as shown in FIG. 4.

Figure 5:
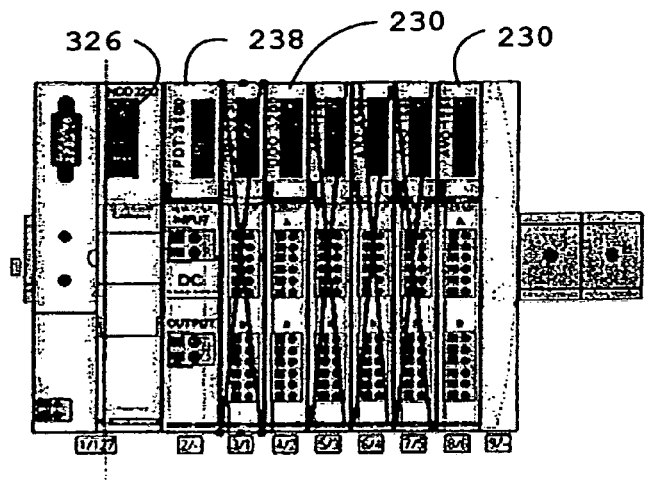
FIG. 5 is a partial display of the main screen similar that of FIG. 2, except those modules configured to be not physically present are indicated as so.

As shown in FIG. 5, those modules selected as not being present are designated with indicia showing their absence. For example, as shown, a selected module can include an "X" over the view of the module to indicate that the module is not physically installed.

Thus, instead of the configuration of FIG. 3, a user may build a physical system that only includes the following modules shown in FIG. 5: the network interface module 326 such as the ADVANTYS STB NCO 2212; the power distribution module 328 such as the ADVANTYS STB PDT 3100; a digital output module 230 such as the ADVANTYS STB DDO 3200; and an analog output module 230 such as the ADVANTYS AVO 1255. Accordingly only two ADVANTYS I/O modules are physically installed.

After the network interface module 326 has powered up and the new configuration has been downloaded, the following will occur: the digital output module 230 has node ID 2; the analog output module 230 has node ID 6; the island state is displayed in the configuration software, and can be sent to the fieldbus master, wherein only those I/O modules 230 that are selected to be physically present are taken into account. In the above, if both of the I/O modules 230 are present and function normally, the island state will not present an error message indicating that unexpected or missing modules are in the island configuration. Under the prior auto-addressing protocol, the node ID's would have had to been node ID 1 and node ID 2.

An auto-addressing protocol of the present invention is provided in the network interface module 326 and the I/O module 230 to "skip" the node ID's of uninstalled modules. In addition to firmware changes, such as in the network interface module, and the I/O modules, certain other changes are desired such as to: the configuration software, and the auto-addressing protocol.

The configuration software provides the user with an interface to select which modules will not be physically present. Since this feature may only be activated with certain network interface module's and I/O modules, it is desired that a message be displayed to alert the user that this feature requires network interface module firmware and/or I/O module firmware having a version number greater than some specified value.

If no module is selected to be "Not present," then the existing auto-addressing protocol is used. However, if a user selects one or more I/O modules not to be present, then the use of an amended auto-addressing protocol is mandatory as described below in a preferred embodiment. In this case, the configuration software alerts the network interface module that one or more I/O modules will not be present, and also delivers a list of node ID's that are not to be used.

A new or amended data field is provided in the network interface module's memory. This bit-mapped field indicates whether a module is physically present or not present in the island. For example, a digital one (1) means the module is physically present, and a digital zero (0) means the module is not physically present. Thus, if nodes 2 and 6 are present, then the corresponding content would be "00100010".

Figure 6:
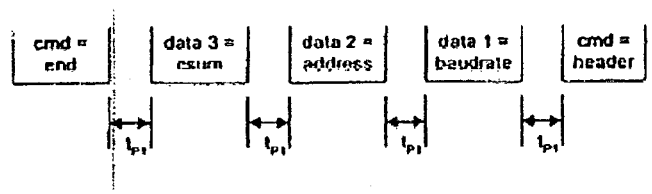
FIG. 6 (PRIOR ART) is a simplified depiction of an auto-addressing protocol data structure; and, FIG. 7 is a simplified depiction of an auto-addressing protocol in accordance with the present invention.
Figure 7:
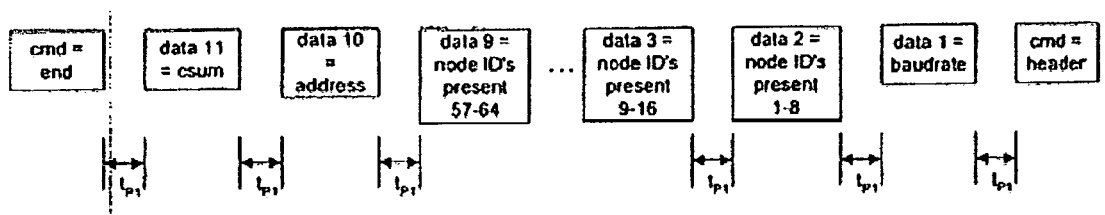

The auto-addressing protocol used before the present invention has a data structure as shown in FIG. 6. Turning to FIG. 7, in an embodiment in accordance with the present invention, the amended auto-addressing protocol delivers an additional 4 to 8 bytes of data that indicate, in a bit-mapped format, which modules are physically present in the island. In this embodiment, the number of addressable node IDs is limited to 32 (with 4 bytes) or 64 (with 8 bytes). The address field (data byte 10) is incremented to contain a value that is one greater than the value chosen by the module.

Preferably, the network interface module will support both existing auto-addressing protocol (FIG. 6) and the amended auto-addressing protocol of the present invention (FIG. 7). The configuration software alerts the network interface module as to which protocol to use. The network interface module may ascertain this information by looking at the new data field. If auto-configuration is selected, i.e., no configuration software is used, then only the existing auto addressing protocol is used.

If the amended auto-addressing protocol is to be used, then the network interface module uses the bit-mapped list made available from the configuration software to form the needed data packets for the amended auto-addressing protocol.

The operational states of the island that rely on the operation states of individual slave nodes consider those nodes configured to be physically present. For example, "non-mandatory module mismatch" warnings should not occur due to missing modules that are configured to be physically not present. In addition, scanning of the island bus for slave modules should be done only for those nodes that are configured to be physically present.

The content of certain status registers in the network interface module can take into account the fact that certain modules may not be physically present. For example, within an ADVANTYS system, the Nd_asf (object dictionary entry 4102$h$) and Nd_err (object dictionary entry 4104$h$) bits should not be set for modules that are selected as not being present.

If the use of the new auto-addressing protocol is indicated in the header byte, then instead of using the data in the "data 10" field (FIG. 7) of the amended auto addressing protocol, the I/O module preferably compares this address to the bit-mapped list in data bytes 2-9. The I/O module selects as its node ID the first available node ID that is greater than or equal to the value contained in the "data 10" field.

As previously mentioned, the data 10 byte (FIG. 7) should be updated with a value one greater than the node ID chosen by the module before it is transmitted.

It is possible to reduce the memory requirement in the I/O modules by modifying data bytes 2-9 as they pass the bytes down to the next module. For example, when the first available node ID is found, that bit is set to zero before passing the byte to the next module. This way, each I/O module only needs to store one byte of data rather than all 8 bytes of the bit-mapped data. This has the effect of eliminating the need for the "data 10" field of FIG. 7 as the next available node ID is contained in data bytes 2-9, thus reducing overhead.

While the specific embodiments have been illustrated and described, numerous modifications come to mind without significantly departing from the spirit of the invention, and the scope of protection is only limited by the scope of the accompanying Claims.

What is claimed is:

1. An apparatus comprising:
a network interface having a plurality of nodes, each node capable of connection to at least one I/O module, each I/O module automatically obtaining a node ID of said each I/O module based on a relative physical location of said each I/O module to other I/O modules using an auto-addressing protocol without using a unique marker of said each I/O module;
an installed I/O module operatively connected to the network interface, the installed I/O module comparing an address value contained in a data field and selecting the node ID using a definitively known first available node ID that is greater than or equal to the address value, the installed I/O module modifying the data field to indicate its selected node ID for a next I/O module; and,
wherein the auto-addressing protocol provides for automatically determining the node ID of the installed I/O module and skipping a node ID of an uninstalled I/O module.

2. The apparatus of claim 1 wherein a local area network is connected to the network interface.

3. The apparatus of claim 1 wherein the network interface is operatively connected to a main PLC.

4. The apparatus of claim 1 wherein the auto-addressing protocol maintains an identical process image without requiring one of reconfiguring and reprogramming of the apparatus when an absolute location of any installed I/O module changes but a relative location of said any installed I/O module to the other I/O modules remains unchanged.

5. The apparatus of claim 1 wherein the installed I/O module supports the auto-addressing protocol.

6. The apparatus of claim 1 wherein the auto-addressing protocol includes data indicating if an I/O module is not present.

7. The apparatus of claim 1, wherein the network interface supports another addressing protocol within the network interface when all I/O modules are installed and configured to receive an indication when to use the auto-addressing protocol and when to use the other addressing protocol.

8. The apparatus of claim 1, further comprising:
a next I/O module; and
the installed I/O module configured to modify a data field before passing the data field to the next I/O module by changing a selected bit in the data field, the selected bit corresponding to a first available node ID.

9. The apparatus of claim 1, wherein the relative physical location of said each I/O module is based on the sequential ordering of said each I/O module with respect to the other I/O modules.

10. A system for configuring a process image with one or more uninstalled modules comprising:
an island having a network interface module, the island further including a plurality of connections for I/O modules, each I/O module automatically obtaining a node ID of said each I/O module based on a relative physical location of said each I/O module to other I/O modules without using a unique marker of said each I/O module, wherein an installed I/O module compares an address value contained in a data field and selects the node ID using a definitively known first available node ID that is greater than or equal to the address value, the installed I/O module modifying the data field to indicate its selected node ID for a next I/O module;
configuration software run by the network interface module that provides for each one of the plurality of connections one of an indication of a first I/O module being physically connected to one of the plurality of connections and an indication of a second I/O module not being present at said one of the plurality of connections.

11. The system of claim 10 wherein the configuration software skips allocation of node IDs for connections having a not present I/O module while creating a process image as if all I/O modules were present.

12. The system of claim 11 wherein the configuration software creates a bit-mapped field that indicates whether an I/O module is physically present in the island.

13. The system of claim 12 wherein the bit-mapped field is transferable to the network interface module.

14. The system of claim 13 wherein the bit-mapped field further indicates whether an I/O module is configured to be physically not present in the island.

15. The system of claim 14 wherein the bit-mapped field is stored as a data field in the network interface module.

16. The system of claim 10 wherein operational states of the island that rely on operational states of an individual I/O module only consider an I/O module that is configured to be physically present.

17. The system of claim 10 wherein scanning of the island for slave I/O modules is done only for those connections of the plurality of connections wherein an I/O module is configured to be physically present.

18. The system of claim 10, wherein the configuration software provides a protocol indication to the network interface module to use an auto-addressing protocol when at least one of the I/O modules is selected to be not present and to use another addressing protocol when no I/O module is selected to be not present.

19. A method of configuring a process image of an island to indicate uninstalled I/O modules comprising the steps of:
providing the island having a network interface module and a plurality of ports, each of the plurality of ports capable of connection to at least one I/O module, each I/O module automatically obtaining node ID of said each I/O module based on relative physical location of said each I/O module to other I/O modules without using a unique marker of said each I/O module, wherein an installed I/O module compares an address value contained in a data field and selects the node ID using a definitively known first available node ID that is greater than or equal to the address value, the installed I/O module modifying the data field to indicate its selected node ID for a next I/O module;
connecting, by a network interface circuit module, I/O modules to select ports of the plurality of ports; and,
creating, by the network interface circuit module, the process image of the island that indicates for each port of the plurality of ports one of whether an I/O module is physically present and not present.

20. The method of claim 19 further comprising the step of:
removing a first I/O module connected to a first port of the plurality of ports; and,
maintaining the process image upon the removal of the first I/O module.

21. The method of claim 20 further comprising the step of:
entering an indication of one of physically present and not physically present through a user interface for each port of the plurality of ports in the island.

22. The method of claim 21 wherein the entering an indication includes checking a box in a window generated on a screen of the user interface.

23. The method of claim 19 wherein the creating step includes:
   generating a bit-mapped field that indicates one of whether an I/O module is physically present and not present for each port of the plurality of ports.

24. The method of claim 23 further comprising the step of:
   transferring the bit-mapped field to the network interface module.

25. The method of claim 19 further comprising:
   supporting an auto-addressing protocol when at least one of the I/O modules is selected to be not present and supporting another addressing protocol when no I/O module is selected to be not present.

* * * * *